United States Patent
Cheng et al.

(10) Patent No.: US 7,316,846 B2
(45) Date of Patent: Jan. 8, 2008

(54) HARD COAT COMPOSITIONS WITH ACID FUNCTIONAL ORGANOSILOXANE POLYOL

(75) Inventors: Shan Cheng, Pittsburgh, PA (US); Brian K. Rearick, Allison Park, PA (US); William H. Retsch, Jr., Castle Shannon, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 115 days.

(21) Appl. No.: 11/116,552

(22) Filed: Apr. 28, 2005

(65) Prior Publication Data
US 2006/0247405 A1    Nov. 2, 2006

(51) Int. Cl.
*B32B 9/04* (2006.01)
*C08G 77/38* (2006.01)

(52) U.S. Cl. ............ 428/447; 106/287.13; 106/287.16; 428/412; 525/100; 525/106; 525/446; 528/26

(58) Field of Classification Search ...................... None
See application file for complete search history.

(56) References Cited

U.S. PATENT DOCUMENTS

| 4,777,277 | A | * | 10/1988 | Colas et al. ................. 556/419 |
|---|---|---|---|---|
| 5,308,525 | A | * | 5/1994 | Koboyashi et al. ......... 252/78.3 |
| 5,349,002 | A | | 9/1994 | Patel ........................... 428/412 |
| 5,411,807 | A | | 5/1995 | Patel et al. .................. 428/412 |
| 5,503,935 | A | | 4/1996 | Patel ........................... 428/412 |
| 5,523,375 | A | * | 6/1996 | Raleigh et al. ................ 528/26 |
| 5,939,491 | A | | 8/1999 | Wilt et al. .................... 525/100 |
| 6,040,394 | A | | 3/2000 | Wilt et al. .................... 525/474 |
| 6,046,276 | A | | 4/2000 | Ambrose et al. ........... 525/101 |
| 6,046,296 | A | | 4/2000 | Wilt et al. ..................... 528/41 |
| 6,048,934 | A | | 4/2000 | Wilt et al. .................... 525/100 |
| 6,103,824 | A | | 8/2000 | Wilt et al. .................... 525/100 |
| 6,103,838 | A | | 8/2000 | Wilt et al. .................... 525/474 |
| 6,187,863 | B1 | | 2/2001 | Wilt et al. .................... 525/100 |
| 2005/0209402 | A1 | | 9/2005 | Ziegler et al. ............... 525/165 |

FOREIGN PATENT DOCUMENTS

| EP | 0 439 294 | 7/1991 |
|---|---|---|
| EP | 0 877 068 | 11/1998 |
| EP | 1 087 001 | 3/2002 |
| JP | 09227704 | 9/1997 |

\* cited by examiner

*Primary Examiner*—Marc S. Zimmer
(74) *Attorney, Agent, or Firm*—Diane R. Meyers; Donald R. Palladino

(57) ABSTRACT

A hard coat composition comprising an acid functional organosiloxane polyol wherein at least some of the acid functionality has been neutralized is disclosed. The hard coat is suitable for application to a substrate, and can be used without an adhesive promoting primer.

22 Claims, No Drawings

HARD COAT COMPOSITIONS WITH ACID FUNCTIONAL ORGANOSILOXANE POLYOL

FIELD OF THE INVENTION

The present invention relates to hard coat compositions comprising an acid functional organosiloxane polyol, wherein at least some of the acid functionality has been neutralized.

BACKGROUND INFORMATION

Plastic substrates, including transparent plastic substrates, are desired for a number of applications, such as windshields, lenses and consumer electronics. To minimize scratching, as well as other forms of degradation, clear "hard coats" are often applied as protective layers to the substrates. A primer is often used to enhance adhesion between the hard coat and the substrate. Hard coats that adhere to these substrates without the use of a primer are desired.

SUMMARY OF THE INVENTION

The present invention is directed to hard coat compositions comprising an acid functional organosiloxane polyol, wherein at least some of the acid functionality has been neutralized. The present invention is further directed to a method for improving adhesion of a hard coat to a substrate comprising adding to the hard coat a composition comprising an acid functional organosiloxane polyol, wherein at least some of the acid functionality has been neutralized. The present invention is also directed to a method for improving a property of a substrate comprising applying to the substrate a coating comprising an acid functional organosiloxane polyol wherein at least some of the acid functionality has been neutralized.

DETAILED DESCRIPTION OF THE INVENTION

The present invention is directed to hard coat compositions comprising an acid functional organosiloxane polyol, wherein at least some of the acid functionality has been neutralized. The term "hard coat," as used herein, refers to a clear coat that offers one or more of chip resistance, impact resistance, abrasion resistance, UV degradation resistance, humidity resistance and/or chemical resistance. Any organosiloxane polyol that either contains acid functionality, or that can be modified to contain acid functionality, can be used according to the present invention. In certain embodiments, the organosiloxane polyol has or contains one of the following general formulas:

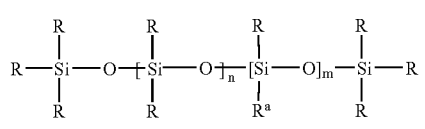  (I)

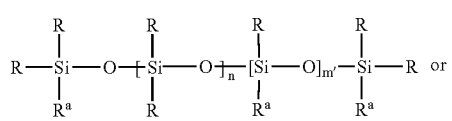  (II)

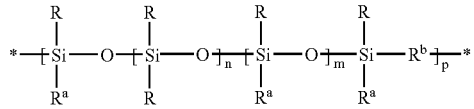  (III)

where m is at least 1; m' is 0 to 50; n is 0 to 50; p is 1 to 50 and each R is independently chosen from OH groups and monovalent hydrocarbon groups connected to the silicon atoms; each $R^a$ has the following structure:

$$R_1—O—X \quad (IV)$$

And $R^b$ has the following structure:

$$R_1—O—R_1 \quad (V)$$

wherein each $R_1$ is independently chosen from alkylene, oxyalkylene or alkylene aryl; and each X is independently a moiety containing a functional group chosen from OH; COOH; NCO; carboxylate such as ester, carbonate and/or anhydride; primary amine; secondary amine; amide; carbamate functional groups; epoxy functional groups; or a component that contains functional groups reactive with the functional groups of the organic polyorganosiloxane. "Monovalent hydrocarbon group(s)" refers to an organic group containing carbon and hydrogen. The hydrocarbon groups may be aliphatic or aromatic, and may contain from 1 to 24 (in the case of aromatic from 3 to 24) carbon atoms. "Monovalent hydrocarbon group(s)" can also be a heteroatomic hydrocarbon group, that is, one or more of the carbon molecules in the groups can be substituted with heteroatoms, typically oxygen or nitrogen. Nonlimiting examples of such monovalent hydrocarbon groups include alkyl, alkoxyl, aryl, alkylaryl or alkoxyaryl groups.

By "alkyl" is meant acyclic or cyclic groups having a carbon chain length of from $C_1$ to $C_{25}$. By "alkoxyl" is meant an alkyl group containing at least one oxygen atom, such as an ether oxygen, and having a carbon chain length of from $C_2$ to $C_{25}$, such as from $C_2$ to $C_8$; this includes compounds having one or more ester linkages. An "aryl" group is an aromatic group containing one or more aromatic rings, fused or unfused, containing 3 to 24 carbons. By "alkylaryl" is meant an acyclic alkyl group having a carbon chain length of from $C_2$ to $C_{25}$ and containing at least one aryl group, such as phenyl. Similarly, "alkoxyaryl" refers to an alkyl group containing at least one oxygen atom and having a carbon chain length of from $C_2$ to $C_{25}$, and at least one aryl group. The aryl group(s), either alone or in conjunction with an alkyl or alkoxy group, may optionally be substituted. Suitable substituents include heteroatoms (O, N and S), hydroxyl, benzyl, carboxylic acid, alkoxy and alkyl groups, for example.

The organosiloxane polyol can be acid functionalized by any means known in the art, for example, oxidation to the carboxylic acid, ring opening of a cyclic anhydride, or condensation with a dicarboxyllic acid. Any suitable compound that imparts acid functionality to the organosiloxane polyol can be used. Examples include, but are not limited to, phthalic anhydride, trimellitic anhydride, hexahydro-4-methylphthalic anhydride, 1,2-cyclohexanedicarboxyllic anhydride, succinnic anhydride, maleic anhydride, glutaric anhydride, and polycarboxylic acids including oxalic acid, malonic acid, succinic acid, glutaric acid, adipic acid, fumaric acid, maleic acid, phthalic acid, terephthalic acid, isophthalic acid, azeleic acid, octadecanoic acid, and 1,4-cyclohexanedicarboxyllic acid. Any percent of the functional groups on the organosiloxane polyol can be acid functional. In certain embodiments, 5 to 100 percent of the functional groups are acid functional, such as 40 to 80 percent, or 70 to 90 percent The acid functional organosiloxane polyol has at least some of the acid functionality neutralized with a suitable neutralizing agent. Suitable neutralizing agents include, for example, amines, hydroxides, and the like. Examples of amines include, but are not limited to, dimethylethylamine, triethylamine, dimethylethanolamine, triethanolamine, diethylethanolamine, dimethylaniline, N-ethylmorpholine, N,N-dimethylaniline, and ammonia. "At least some" when used in relation to neutralization means any amount at all, in certain embodiments, 1 to 100 percent of the acid functionality will be neutralized, such as 20 to 40 percent or 30 percent. In certain embodiments, the amount of neutralization is that amount that gives the organosiloxane polyol the desired level of solubility. Neutralization can be accomplished simply through addition of a neutralizing agent to a solution of the acid functional organosiloxane polyol with stirring.

The hard coat compositions of certain embodiments of the present invention can further comprise an alkoxide having the general formula $R_xM(OR')_{z-x}$ where R is an organic radical, M is silicon, aluminum, titanium, and/or zirconium, each R' is independently an alkyl radical, z is the valence of M, and x is a number less than z and may be zero. Examples of suitable organic radicals include but are not limited to alkyl, vinyl, methoxyalkyl, phenyl, $\alpha$-glycidoxy propyl and $\alpha$-methacryloxy propyl. The alkoxide can be unhydrolyzed, partially hydrolyzed or fully hydrolyzed. The alkoxide can be further mixed and/or reacted with other compounds and/or polymers known in the art. Particularly suitable are compositions comprising siloxanes formed from at least partially hydrolyzing an organoalkoxysilane, such as one within the formula above. Examples of suitable alkoxide-containing compounds and methods for making them are described in U.S. Pat. Nos. 6,355,189; 6,264,859; 6,469,119; 6,180,248; 5,916,686; 5,401,579; 4,799,963; 5,344,712; 4,731,264; 4,753,827; 4,754,012; 4,814,017; 5,115,023; 5,035,745; 5,231,156; 5,199,979; and 6,106,605, all of which are incorporated by reference herein. A suitable commercially available alkoxide hard coat from PPG Industries, Inc. is SOLGARD 330.

The hard coat compositions of the present invention can also include one or more standard additives such as flow additives, rheology modifiers, adhesion promoters, catalysts, pigments, dyes and the like. In certain embodiments, the hard coat compositions can comprise a UV absorber. The UV absorber can be added into the hard coat composition by any means. In certain embodiments, the UV absorber is attached directly to the organosiloxane polyol. This can be accomplished, for example, by reacting functionality on the UV absorber with functionality on the organosiloxane polyol. In certain embodiments, the UV absorber has alkoxy functionality, which is reacted with hydroxyl functionality.

The acid functional organosiloxane polyol can be present in the hard coat composition in an amount of 1 to 25 weight percent, such as 5 to 15 weight percent, with weight percent being based on the totalsolid weight of the composition. When an alkoxide is also used in the composition, it will typically comprise 50 to 99 weight percent based on total solid weight If an acid functional organosiloxane polyol is used with a partially or fulled hydrolyzed alkoxide, it can simply be added to the alkoxide with stirring. In certain embodiments, rather than post-adding an acid functional organosiloxane polyol to an unhydrolyzed or partially hydrolyzed alkoxide coating, the alkoxy silane precursors and organosiloxane polyol can be co-hydrolyzed. This can be done using methods standard in the art. A silylated UV absorber, such as those from Gelest, Inc., can also be used in the reaction.

In certain embodiments of the present invention, the hard coat composition does not comprise one or more of polycaprolactone polyol, (meth)acrylate ester, hydroxy acrylate, (meth)acrylated polyurethane, and/or acrylic copolymers and/or vinyl aromatic compounds.

The present invention is also directed to a method for improving adhesion between a hard coat and a substrate comprising adding to the hard coat an acid functional organosiloxane polyol, wherein at least some of the acid functionality has been neutralized. The acid functional organosiloxane polyol is as described above. Any amount of improved adhesion is within the scope of the present invention; whether improved adhesion is observed can be easily determined using testing standard in the art, such as cross hatch tape adhesion testing, abrasion resistance testing and the like. Comparing the results obtained with a hard coat both with and without the organosiloxane polyol described above will indicate whether improved adhesion is achieved.

The present invention is further directed to a method for improving a property of a substrate comprising applying to the substrate a coating comprising an acid functional organosiloxane polyol, wherein at least some of the acid functionality has been neutralized, such as any of the coatings described above. As used herein, "improving a property" and like terms refers to improving a property of the substrate such as chip resistance, impact resistance, abrasion resistance, UV degradation resistance, humidity resistance and/or chemical resistance including but not limited to alkali resistance.

Suitable substrates that can be treated according to the present invention generally include plastic substrates, such as thermoplastic substrates, including but not limited to polycarbonates, acrylonitrile butadiene styrene, blends of polyphenylene ether and polystyrene, polyetherimides, polyesters, polysulfones, acrylics, and copolymers and/or blends of any of these. The coating comprises the acid functional organosiloxane polyol, as described above. The coating can also further comprise an alkoxide and/or any standard additives, also as described above.

The coating composition can be applied to the substrate by any means known in the art, such as spraying, dipping, roll coating, flow coating, brushing, and the like. The coating can then be cured, such as by flashing the coating at ambient temperature for up to one hour, and then baking the coating at an appropriate temperature and time, which can be determined by one skilled in the art based upon the particular coating and/or substrate being used. The dry film thickness of the coating on the substrate can be from 1 to 10 microns, such as 5 to 7 microns. The coating can be applied directly to the substrate without a primer or other intervening layer with suitable adhesion being observed.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. For example, while embodiments of the coatings of the present invention have been described in terms of "an" acid functional organosiloxane polyol, one or more such polyols can be used. Similarly, more than one alkoxide, UV absorber, and/or any other additive can also be used. Also, as used herein, the term "polymer" is meant to refer to prepolymers, oligomers and both homopolymers and copolymers; the prefix "poly" refers to two or more.

EXAMPLES

The following examples are intended to illustrate the invention, and should not be construed as limiting the invention in any way.

Example 1

An acid functionalized organosiloxane polyol was prepared in a glass reaction vessel equipped with an addition funnel, mechanical agitation and a nitrogen blanket. 638 parts by weight of 1,2-propylene glycol monoallyl ether, 0.05 parts by weight of sodium acetate, and 0.45 parts by weight of a catalyst solution (7.5% by weight of Chloroplatinic acid in iso-propanol) were added to the reaction vessel and heated to 80° C. 320.4 parts by weight of 1,1,3,3-tetramethyl disiloxane were charged to the addition funnel, and 5% of the material in the addition funnel was added to the reaction vessel. The remaining contents of the addition funnel were added to the reaction vessel over 2 hours and the reaction temperature was increased to 100° C. from the heat of the reaction. After complete addition the reaction temperature was held for 1 hour at 100° C. Filtration of the reaction product yielded a colorless carbinol functional siloxane, intermediate A. 534 parts by weight of intermediate A were transferred to a second glass reaction vessel under a nitrogen blanket and the vessel was heated to 60° C. Then 369.6 parts by weight of phthalic anhydride were added to the reaction vessel in portions over 40 minutes. The temperature of the reaction vessel was increased over a period of 8 hours to a temperature of 110° C. at which point the solution cleared. The reaction temperature was reduced to 75° C. and 903.6 parts by weight of iso-propanol were added.

Example 2

The reaction product of Example 1 was allowed to cool to room temperature and then 69.7 parts by weight of N,N-dimethylethanolamine were added. The contents of the reaction vessel were filtered to yield a partially neutralized carboxylic acid functional siloxane solution with a measured 1.451 milliequivalents of acid and 0.433 milliequivalents of base per gram of solution.

Example 3

A modified organosiloxane polyol was prepared in a glass reaction vessel equipped with mechanical agitation and a nitrogen blanket. 630 parts by weight of a siloxane carbinol prepared as described in Example A of U.S. Pat. No. 6,387,519, were heated to 80° C. Then 215.6 parts by weight of phthalic anhydride were added to the reaction vessel in portions over 35 minutes. The temperature of the reaction vessel was held at 80° C. for 8 hours. The reaction temperature was reduced to 50° C. and 808.2 parts by weight of iso-propanol were added. The reaction was allowed to cool to room temperature and then 37.4 parts by weight of N,N-dimethylethanolamine were added. The contents of the reaction vessel were filtered to yield a partially neutralized carboxylic acid functional siloxane solution with a measured 0.981 milliequivalents of acid and 0.261 milliequivalents of base per gram of solution.

Example 4

The coating solutions were prepared as follows: Pre-hydrolyzed alkoxysilane hardcoat (SOLGARD 330, from PPG Industries, Inc.) and acid functionalized organosiloxane polyol adhesion promoters prepared according to Examples 1-3 were diluted with 1-propanol to 15% solids (by weight). The adhesion promoter solutions were added into hardcoat solutions under stirring as indicated in Table 1 below. Weights are given in grams.

MOKROLON polycarbonate substrate from Bayer was wiped and rinsed with 2-propanol. Coatings were flow or spray applied on un-primed substrate and flashed at ambient for 5 minutes. The coated polycarbonate was baked at 120° C. for 3 hours. The dry film thickness of the coating was 5-7 μm. Coated panels were tested for adhesion and taber abrasion resistance.

As demonstrated in Table 1, coatings without the partially neutralized acid functionalized organosiloxane polyol adhesion promoter did not provide acceptable adhesion. Without acceptable adhesion, coatings do not exhibit abrasion resistance. Therefore only the samples that passed the adhesion test were evaluated for taber abrasion resistance.

TABLE 1

| | Sample | | | | | | | | | |
| --- | --- | --- | --- | --- | --- | --- | --- | --- | --- | --- |
| Component | 1 | 2 | 3 | 4 | 5 | 6 | 7 | 8 | 9 | 10 |
| Pre-hydrolyzed alkoxysilane coating[1] | 30 | — | 30 | — | 30 | — | 30 | — | — | — |
| Pre-hydrolyzed alkoxysilane coating[2] | — | 30 | — | 30 | — | 30 | — | 30 | 40 | 40 |
| Organosiloxane Polyol[3] | — | — | 1.5 | 1.5 | — | — | — | — | — | — |
| Acid functionalized Organosiloxane Polyol[4] | | | | | 1.5 | 1.5 | — | — | — | — |
| Partially neutralized acid functionalized Organosiloxane Polyol[5] | — | | | | | | 1.5 | 1.5 | — | — |
| Partially neutralized | — | — | — | — | — | — | — | — | 0.82 | 1.67 |

TABLE 1-continued

| | | | | | | | | | | |
|---|---|---|---|---|---|---|---|---|---|---|
| acid functionalized Organosiloxane Polyol[6] | | | | | | | | | | |
| Testing | | | | Results | | | | | | |
| Appearance[7] | Clear | Clear | Partially hazy | Partially hazy | Partially hazy | Partially hazy | Clear | Clear | Clear | Clear |
| Adhesion[8] | 0 | 0 | 3 | 3 | 3 | 3 | 5 | 5 | 5 | 5 |
| Haze % after Taber Abrasion[9] | — | — | — | — | — | — | 15.9 | 11.5 | 6.9 | 6.2 |

[1]SOLGARD 330, commercially available from PPG Industries, Inc.
[2]A prehydrolyzed alkoxysilane coating was prepared by adding 74 g of methanol to 190 g of deionized water in a clean reaction vessel. The heat of solution caused the temperature to increase from 22° C. to 32° C. The contents were cooled with an ice bath to between 5 to 10° C. 395 grams of methyltrimethoxysilane, 39.5 g of glycidoxypropyltrimethoxysilane, 19.8 g of glacial acetic acid, and 0.15 g of nitric acid (70%) were blended together in a separate container. When the temperature of the methanol solution reached between 5-10° C., this mixture was rapidly added with stirring to the reaction vessel. The exotherm from the hydrolysis reaction rapidly raised the temperature to between 40 and 50° C. within 5 minutes. The contents of the reaction vessel were cooled with an ice bath to between 20 to 25° C. and held within this temperature range for 2 to 3 hours. After this time 4.1 g of 25% tetramethylammonium hydroxide (TMAOH) solution is methanol was added. The pH of the mixture before this addition was ~2.2 and after the TMAOH addition, the pH was ~4.8. Then 124.5 g of n-propanol and 1.66 g of BYK 306 (polydimethylsiloxane surfactant from BYK Chemie) were added with stirring. The final pH of the mixture was ~5.0. The coating solution was then filtered through a 0.45 micron nominal capsule filter in a single pass.
[3]Organosiloxane polyol prepared according to Example 3 of U.S. Pat. No. 6,387,519.
[4]Modified organosiloxane polyol with 40% of —OH group reacted with acid prepared according to Example 1.
[5]Modified organosiloxane polyol with 80% of —OH group reacted with acid and 30% of acid was neutralized prepared according to Example 2.
[6]Modified organosiloxane polyol with 40% of —OH group reacted with acid and 30% of acid was neutralized prepared according to Example 3.
[7]As visually observed after cure.
[8]Adhesion: Crosshatch, Nichibon LP-24 adhesive tape. Rating scale 0-5 (no adhesion - 100% adhesion after tape peeling).
[9]Taber Abrasion: Taber 5150 Abrader, CS-10 wheels, 500 g weight. Haze % was measured after 500 taber abrasion cycles. The haze of an uncoated substrate after 50 taber abrasion cycles was about 30%.

Example 5

Co-Hydrolyzed Sol-Gel Hardcoat with Silylated UVA 66.00 grams of DI water and 30.00 grams of methanol were mixed in a clean reaction vessel. Increased temperature was observed as the result of the exothermal mixing process. The contents were cooled with a water bath to between 20-25° C.

In a separate container, 96.00 grams of methyltrimethoxysilane, 9.60 grams of glycidoxypropyltrimethoxysilane, 4.80 grams of glacial acetic acid, 1.88 grams of UVINUL 400, 4.17 grams of 2-hydroxy-4-(3-triethoxysilylpropoxy)diphenylketone, and 7.70 grams of cationic polymer adhesion promoter were blended together. When the temperature of Step 1 reached between 20-25° C., the contents of Step 2 were rapidly added with stirring to the reaction vessel. The water bath kept the maximum reaction temperature between 35-50° C. The maximum temperature was reached 1-2 minutes after the addition of the step 2 silane solution. After a half hour, the water bath was removed, and the reaction vessel was stirred for 16-22 hours.

In a separate container, 30.00 grams of 2-propanol, 15.00 grams of diacetone alcohol, 0.24 grams of BYK-300, a flow additive from BYK Chemie, and 0.12 grams of sodium acetate tri-hydrate were mixed. This mixture solution was added into the reaction vessel, and the reaction mixture stirred for an additional 4-5 hours.

0.48 grams of 25% tetramethylammonium hydroxide solution in methanol and 36.00 grams of ethyl acetate were mixed in a separate container. This tetramethylammonium hydroxide solution was then added into the reaction vessel. The reaction mixture was stirred for an additional 24 hours at room temperature. The final pH of the mixture was ~5.0.

The coating solution was then filtered through a 0.45 micron nominal capsule filter in a single pass and stored refrigerated.

Whereas particular embodiments of this invention have been described above for purposes of illustration, it will be evident to those skilled in the art that numerous variations of the details of the present invention may be made without departing from the invention as defined in the appended claims.

What is claimed is:

1. A hard coat composition comprising an alkoxide having the general formula $R_xM(OR')_{z-x}$ where R is an organic radical, M is silicon, aluminum, titanium, and/or zirconium, each R' is independently an alkyl radical, z is the valence of M, and x is a number less than z and may be zero, and an organosiloxane derived from an organosiloxane polyol, wherein the orgianosiloxane polyol is at least partially acid functionalized and wherein at least some of the acid functionality has been neutralized.

2. The composition of claim 1, wherein the organosiloxane has the general formula:

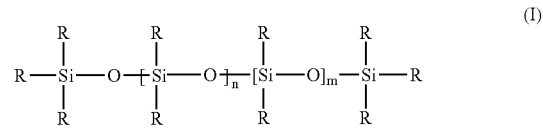

(I)

wherein m is at least 1; n is 0 to 50; each R is independently chosen from OH groups and monovalent hydrocarbon groups connected to the silicon atoms; $R^a$ is independently selected from the following structure:

$$R_1\text{—}O\text{—}X \quad \text{(IV)}$$

wherein $R_1$ is chosen from alkylene, oxyalkylene or alkylene aryl; and X is a moiety containing a functional group chosen from OH; COOH; NCO; carboxylate, carbonate and/or anhydride; primary amine; secondary amine; amide; carbamate functional groups; epoxy functional groups; or a component that contains functional groups reactive with the functional groups of the organic polysiloxane, with the proviso that at least some of the X moieties comprise carboxylate groups.

3. The composition of claim 1, wherein the organosiloxane has the general formula:

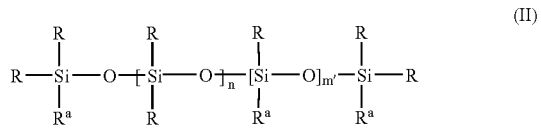

wherein m' is 0 to 50; n is 0 to 50; each R is independently chosen from OH groups or monovalent hydrocarbon groups connected to the silicon atoms; each $R^a$ has the following structure:

$$R_1\text{—}O\text{—}X \quad \text{(IV)}$$

wherein each $R_1$ is independently chosen from alkylene, oxyalkylene or alkylene aryl; and each X is independently a moiety containing a functional group chosen from OH; COOH; NCO; carboxylate, carbonate and/or anhydride; primary amine; secondary amine; amide; carbamate functional groups; epoxy functional groups; or a component that contains functional groups reactive with the functional groups of the organic polysiloxane, with the proviso that at least some of the X moieties comprise carboxylate groups.

4. The composition of claim 1, wherein the acid functionality derives from phthalic anhydride.

5. The composition of claim 1, wherein 40 to 80 percent of the organosiloxane polyol functional groups are acid functionalized.

6. The composition of claim 1, wherein the organosiloxane has the general formula:

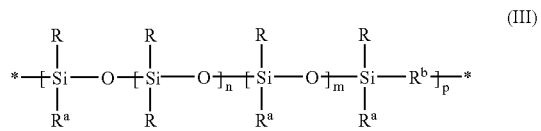

where m is at least 1; n is 0 to 50; p is 1 to 50 and each R is independently chosen from OH groups and monovalent hydrocarbon groups connected to the silicon atoms; each $R^a$ is independently selected from the following structure:

$$R_1\text{—}O\text{—}X \quad \text{(IV)}$$

and each $R^b$ is independently selected from the following structure:

$$R_1\text{—}O\text{—}R_1 \quad \text{(V)}$$

wherein each $R_1$ is independently chosen from alkylene, oxyalkylene or alkylene aryl; and each X is independently a moiety containing a functional group chosen from OH; COOH; NCO; carboxylate, carbonate and/or anhydride; primary amine; secondary amine; amide; carbamate functional groups; epoxy functional groups; or a component that contains functional groups reactive with the functional groups of the organic polyorganosiloxane, with the proviso that at least some of the X moieties comprise carboxylate groups.

7. The composition of claim 1, wherein 20 to 40 percent of the acid functionality has been neutralized.

8. The composition of claim 7, wherein 30 percent of the acid functionality has been neutralized.

9. The composition of claim 1, wherein the alkoxide is organoalkoxysilane.

10. The composition of claim 1, wherein the organosiloxane polyol is at least partially acid functionalized by reacting at least some of the hydroxyl groups of the polyol with an organic diacid and/or anhydride.

11. A method for improving adhesion between a hard coat and a substrate, comprising adding to the hard coat a composition comprising an organosiloxane derived from an organosiloxane polyol, wherein the organosiloxane polyol is at least partially acid functionalized and wherein at least some of the acid functionality has been neutralized.

12. The method of claim 11, wherein the substrate is thermoplastic.

13. The method of claim 12, wherein the substrate is polycarbonate.

14. The method of claim 11, wherein the composition further comprises an alkoxide.

15. The method of claim 14, wherein the alkoxide is organoalkoxysilane.

16. The method of claim 11, wherein the organosiloxane is in the hard coat in an amount of 5 to 15 weight percent, with weight percent based on the total solid weight of the hard coat.

17. The method of claim 11, wherein the organosiloxane polyol is at least partially acid functionalized by reacting at least some of the hydroxyl groups of the polyol with an organic diacid and/or anhydride.

18. A method for improving a property of a substrate, comprising applying to at least a portion of the substrate a coating comprising an acid functional organosiloxane derived from an organosiloxane polyol, wherein 1 to 50 percent of the acid functionality has been neutralized.

19. The method of claim 18, wherein the substrate is a thermoplastic substrate.

20. The method of claim 19, wherein the substrate comprises polycarbonate.

21. The method of claim 18, wherein the coating further comprises an alkoxide.

22. The method of claim 18, wherein the organosiloxane polyol is at least partially acid functionalized by reacting at least some of the hydroxyl groups of the polyol with an organic diacid and/or anhydride.

* * * * *

UNITED STATES PATENT AND TRADEMARK OFFICE
CERTIFICATE OF CORRECTION

PATENT NO. : 7,316,846 B2  
APPLICATION NO. : 11/116552  
DATED : January 8, 2008  
INVENTOR(S) : Shan Cheng et al.

Page 1 of 1

It is certified that error appears in the above-identified patent and that said Letters Patent is hereby corrected as shown below:

Col. 8, line 52, claim 1, "orgianosiloxane" should be --organosiloxane--.

Col. 8, line 64, claim 2 (the bottom line of the formula), the third "R" should be --$R^a$--.

Signed and Sealed this

Tenth Day of June, 2008

JON W. DUDAS  
*Director of the United States Patent and Trademark Office*